(12) United States Patent
Haase et al.

(10) Patent No.: US 11,775,554 B2
(45) Date of Patent: *Oct. 3, 2023

(54) SUBSCRIPTION-BASED CHANGE DATA CAPTURE MECHANISM USING DATABASE TRIGGERS

(71) Applicant: SAP SE, Walldorf (DE)

(72) Inventors: Sebastian Haase, Kronau (DE); Tobias Karpstein, Eschelbronn (DE); Michael Haberkorn, Bad Schoenborn (DE)

(73) Assignee: SAP SE, Walldorf (DE)

( * ) Notice: Subject to any disclaimer, the term of this patent is extended or adjusted under 35 U.S.C. 154(b) by 92 days.

This patent is subject to a terminal disclaimer.

(21) Appl. No.: 17/244,547

(22) Filed: Apr. 29, 2021

(65) Prior Publication Data

US 2021/0248159 A1 Aug. 12, 2021

Related U.S. Application Data

(63) Continuation of application No. 16/443,362, filed on Jun. 17, 2019, now Pat. No. 10,997,206.

(60) Provisional application No. 62/830,748, filed on Apr. 8, 2019.

(51) Int. Cl.
*G06F 16/27* (2019.01)
*G06F 16/23* (2019.01)
*G06F 16/22* (2019.01)

(52) U.S. Cl.
CPC .......... *G06F 16/27* (2019.01); *G06F 16/2282* (2019.01); *G06F 16/2379* (2019.01)

(58) Field of Classification Search
CPC .. G06F 16/27; G06F 16/2282; G06F 16/2379; G06F 16/2358; G06F 16/22; G06F 16/23
See application file for complete search history.

(56) References Cited

U.S. PATENT DOCUMENTS

| | | | |
|---|---|---|---|
| 10,997,206 B2 * | 5/2021 | Haase | ................. G06F 16/2379 |
| 11,232,000 B1 * | 1/2022 | Bhatia | ................. G06F 11/1464 |
| 11,360,998 B2 * | 6/2022 | Hrle | ...................... G06F 16/273 |
| 2008/0209007 A1 | 8/2008 | Gurecki et al. | |
| 2009/0037337 A1 | 2/2009 | Baitalmal et al. | |
| 2010/0030730 A1 | 2/2010 | Shang et al. | |
| 2012/0330954 A1 | 12/2012 | Sivasubramanian et al. | |
| 2015/0081785 A1 * | 3/2015 | Angelsmark | ........... G06F 9/542 709/204 |
| 2017/0351585 A1 * | 12/2017 | Bourbonnais | ........... G06F 16/27 |

(Continued)

*Primary Examiner* — Wilson Lee
(74) *Attorney, Agent, or Firm* — Sterne, Kessler, Goldstein & Fox P.L.L.C.

(57) ABSTRACT

Disclosed herein are system, method, and computer program product embodiments for replicating data from a source database table to a target database table. An embodiment operates by maintaining a master logging table in communication with a source database table and a subscriber logging table. Thereafter, a copy of a first modification of data of the source database table is provided to the master logging table as a record, where the first record includes the copy of the first modification of data. Subsequently, upon determining that the first record in the master logging table is committed, a copy of the first record is provided to the subscriber logging table. And after identifying a first target database associated with the master logging table, the first record is sent to the first target database.

20 Claims, 9 Drawing Sheets

(56) References Cited

U.S. PATENT DOCUMENTS

2018/0121292 A1* 5/2018 Kosaraju ............. G06F 11/1461
2019/0303470 A1* 10/2019 Lee ....................... G06F 16/284
2020/0320095 A1 10/2020 Haase et al.

* cited by examiner

| CL | Delta Timestamp | Subscriber ID | Object Name | Object Type |
|---|---|---|---|---|
| 000 | 20.190.328.151.306,0000000 | 0050568282251EEE9938EF75B76F67BC5 | ZSLT_FLIGHTBOOKING | DDLS |
| 000 | 20.190.328.151.307,0000000 | 0050568282251EEE993910F1F50847EB4 | ZSLT_FLIGHTBOOKING | DDLS |
| 000 | 20.190.328.151.307,0000000 | 0050568282251EEE993913F22C23EE9 | ZSLT_FLIGHTBOOKING | DDLS |
| 000 | 20.190.328.151.307,0000000 | 0050568282251EEE993913EFAB6007F0B | ZSLT_FLIGHTBOOKING | DDLS |
| 000 | 20.190.328.151.307,0000000 | 0050568282251EEE993914B1A18EBBF11 | ZSLT_FLIGHTBOOKING | DDLS |
| 000 | 20.190.328.151.307,0000000 | 0050568282251EEE993915B93C1663F36 | ZSLT_FLIGHTBOOKING | DDLS |
| 000 | 20.190.401.123.336,0000000 | 0050568282251ED994BEC770FB42CF7F | ZSLT_FLIGHTBOOKING | DDLS |
| 000 | 20.190.401.123.336,0000000 | 0050568282251EEE994BFEA933E219148 | ZSLT_FLIGHTBOOKING | DDLS |
| 000 | 20.190.402.031.412,0000000 | 0050568282251EEE9959EAA3ACEEE8A293 | ZSLT_FLIGHTBOOKING | DDLS |
| 000 | 20.190.402.035.411,0000000 | 0050568282251EEE9959EAA3ACEEE8A293 | ZSLT_FLIGHTBOOKING | DDLS |
| 000 | 20.190.403.080.042,0000000 | 0050568282251ED995B7C087FC780320 | ZSLT_FLIGHTBOOKING_TAB | DDLS |
| 000 | 20.190.421.152.710,0000000 | 0050568282251ED995B7C70A5B608333 | ZSLT_FLIGHTBOOKING_TAB | DDLS |

FIG. 4

| CL | Subscriber ID | Object Name | Object Type | Subscriber LogTab | Pointer |
|---|---|---|---|---|---|
| 000 | ODQ~000 | ZSB_SBOOK_FILTER_CDS | DDLS | /1DH/SL000000001 | 2 |
| 000 | 005056828225 1ED994BEC770FB42CF7F | ZSLT_FLIGHTBOOKING | DDLS | /1DH/SL000000001 | 4 |
| 000 | 005056828225 1ED994BFEA933E219148 | ZSLT_FLIGHTBOOKING | DDLS | /1DH/SL000000001 | 6 |
| 000 | 005056828225 1EE9959EAA3ACEE8A293 | ZSLT_FLIGHTBOOKING | DDLS | /1DH/SL000000001 | 8 |
| 000 | ODQ~000 | ZSLT_FLIGHTBOOKING | DDLS | /1DH/SL000000001 | 4 |
| 000 | 005056828225 1EE9938EF75B76F67BC5 | ZSLT_FLIGHTBOOKING | DDLS | /1DH/SL000000001 | 5 |
| 000 | 005056828225 1EE993910F1F50847EB4 | ZSLT_FLIGHTBOOKING | DDLS | /1DH/SL000000001 | 2 |
| 000 | 005056828225 1EE993913 75F22C23EE9 | ZSLT_FLIGHTBOOKING | DDLS | /1DH/SL000000001 | 3 |
| 000 | 005056828225 1EE9939 13EFAB6007F0B | ZSLT_FLIGHTBOOKING | DDLS | /1DH/SL000000001 | 8 |
| 000 | 005056828225 1EE993914B1A18EBBF11 | ZSLT_FLIGHTBOOKING | DDLS | /1DH/SL000000001 | 4 |
| 000 | 005056828225 1EE993915B93C1663F36 | ZSLT_FLIGHTBOOKING | DDLS | /1DH/SL000000001 | 12 |
| 000 | ZMH_TEST | ZSLT_FLIGHTBOOKING | DDLS | /1DH/SL000000001 | 6 |
| 000 | 005056828225 1ED995B7C70A5B608333 | ZSLT_FLIGHTBOOKING_TAB | DDLS | /1DH/SL000000001 | 5 |
| 000 | ODQ~000 | ZSLT_FLIGHTBOOKING_TAB | DDLS | /1DH/SL000000001 | 2 |
| 000 | 005056828225 1ED995B7C087FC780320 | ZSLT_FLIGHTBOOKING_TAB | DDLS | /1DH/SL000000001 | 1 |
| 000 | 005056828225 1ED995B7C087FC780320 | ZSLT_FLIGHTBOOKING_TAB | DDLS | /1DH/SL000000001 | 0 |
| 000 | 005056828225 1ED995B7C70A5B608333 | ZSLT_FLIGHTBOOKING_TAB | DDLS | /1DH/SL000000002 | 0 |
| 000 | ODQ~000 | ZSLT_FLIGHTBOOKING_TAB | DDLS | /1DH/SL000000002 | 2 |

SUBSCRIPTION-BASED CHANGE DATA CAPTURE MECHANISM USING DATABASE TRIGGERS

CROSS REFERENCE TO RELATED APPLICATIONS

This application is a continuation of U.S. patent application Ser. No. 16/443,362, filed Jun. 17, 2019, now allowed, which claims priority to U.S. Provisional Patent Application No. 62/830,748, filed on Apr. 8, 2019, all of which are herein incorporated by reference in their entireties.

BACKGROUND

Databases store a wide variety of data and are continually updated. As these updates are made, mechanisms are typically utilized to capture and provide the updates to subscribers. However, typical mechanisms are limited in the number of subscribers they are able to support. Moreover, for the greater numbers of subscribers and higher rates of updates, the process of copying the data for subscribers may be significantly slow and inefficient. Along these lines, depending on the change of the rate of the updates, such mechanisms may lock if attempting to insert new records while sending previously related records, thus causing operation of the process to cease altogether.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for replicating data from a source system to a target system.

Figure 1:
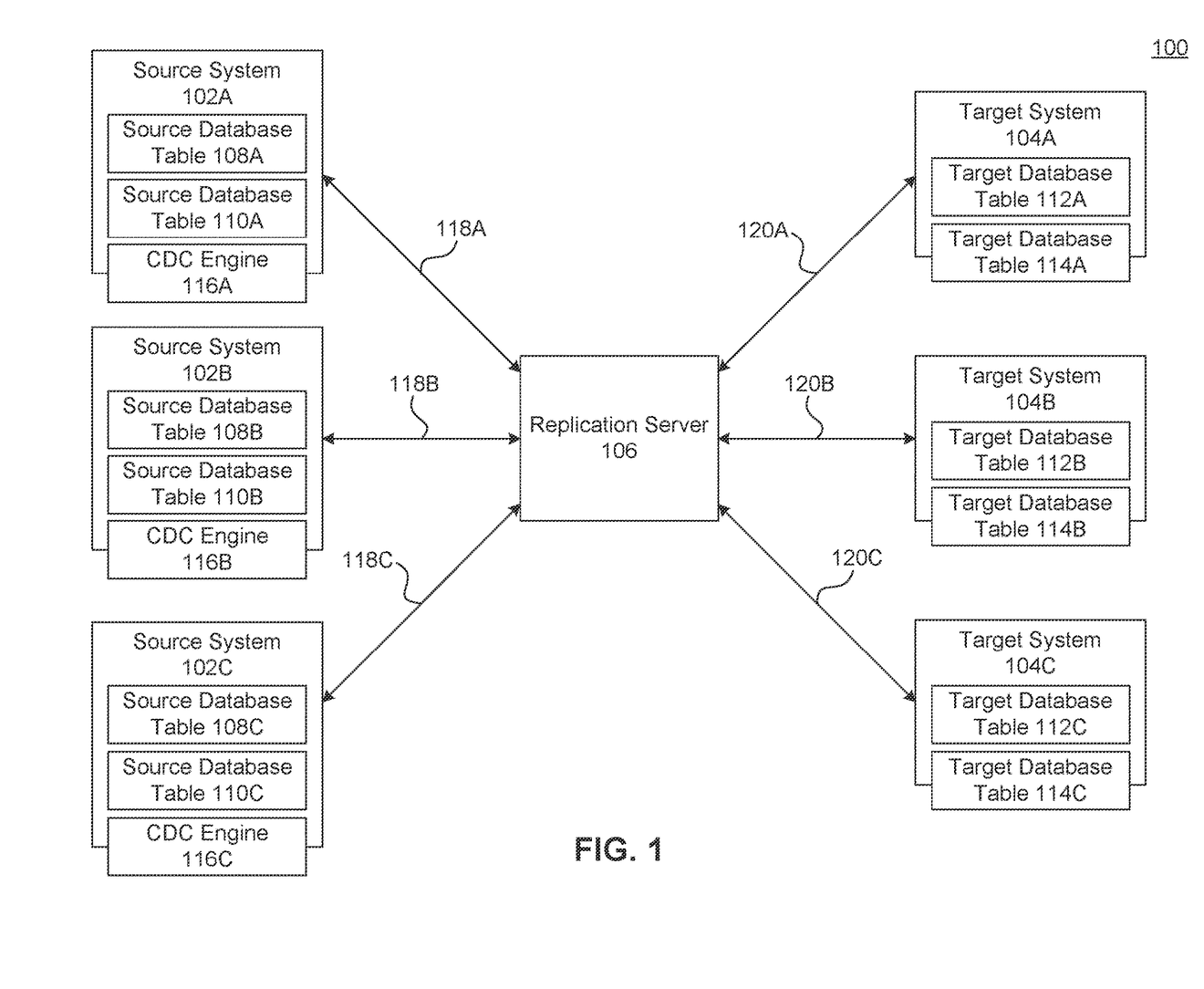
FIG. 1 is a block diagram of a system for replicating data from a source system to a target system, according to some embodiments.

FIG. 1 illustrates an example database system 100 for utilizing triggers for replicating data from a source system 102 to a target system 104. The database system 100 may include source systems 102, target systems 104, and a replication server 106. The source systems 102 and the target systems 104 may be managed by different entities (e.g., an organization) from the replication server 106. For example, in some embodiments, the source systems 102 and/or the target systems 104 may be managed by the same entity, and the replication server 106 may be managed by a third-party entity different therefrom. In other embodiments, the source systems 102, the target systems 104, and the replication server 106 may be managed by different entities. As such, the replication server 106 may be managed independently from the source systems 102 and the target systems 104.

Moreover, the source systems 102 may be in communication with the replication server 106 over a first communication line or medium 118, and the target systems 104 over the second communication line or medium 120. The second and first communication lines or mediums 118 and 120 may be private. As such, the first and second communication lines or mediums 118 and 120 may be a secure line of communication and may be provided by the entity managing the source systems 102 and the target systems 104.

The source systems 102 may contain source database tables 108 and 110, and the target systems 104 may contain target database tables 112 and 114. The source database tables 108 and 110 may contain records that users request monitoring by the replication server 106, and the target database tables 112 and 114 may be user selected to receive any updates (e.g., insert, delete, or update) from the source database tables 108 and 110's records. As such, users may subscribe to monitoring and/or receiving the source database table 108 and 110's data. Along these lines, users may subscribe to receive such data in the target database tables 112 and 114. In some embodiments, users may subscribe to monitoring and receiving data of a single source database table 108A, 108B, or 108C. In other embodiments, as will be described in more detail below, users may subscribe to monitoring and receiving data of entities (e.g. CDS Views) that may share multiple source database tables 108 and 110, which may be of the same or different source systems 102. In these embodiments, users may subscribe to receiving such data in particular target database tables 112 and 114. Thus, where data is replicated from particular source database tables 108 and 110 to particular target database tables 112 and 114, the particular source database tables 108 and 110 and target database tables 112 and 114 may contain the same data.

The source systems may include change data capture (CDC) engines 116, which may be in communication with the source database tables 108 and 110. The CDC engine 116 may record the changes of the source databases tables 108 and 110 and then provide the changes to the replication server. In doing so, the CDC engine 116 may provide a subscription model as will be described in more detail below.

The replication server 106 may then be in communication with the source system 102's CDC engine 116. As such, the replication server 106 may act as a subscriber to the CDC engines 116. In doing so, the replication server 106 may manage the connections between the source database tables 108 and 110 and the target database tables 112 and 114. Each connection between source database tables 108 and 110 and the target database tables 112 and 114 may be considered a configuration. The replication server 106 may then provide the appropriate data—recorded by the CDC engines 116—to the target database tables 112 and 114. By decoupling the CDC engines 116 from the replication server 106, other applications may leverage the CDC engine 116 without the need of creating a configuration in the replication server 106 itself.

Figure 2:
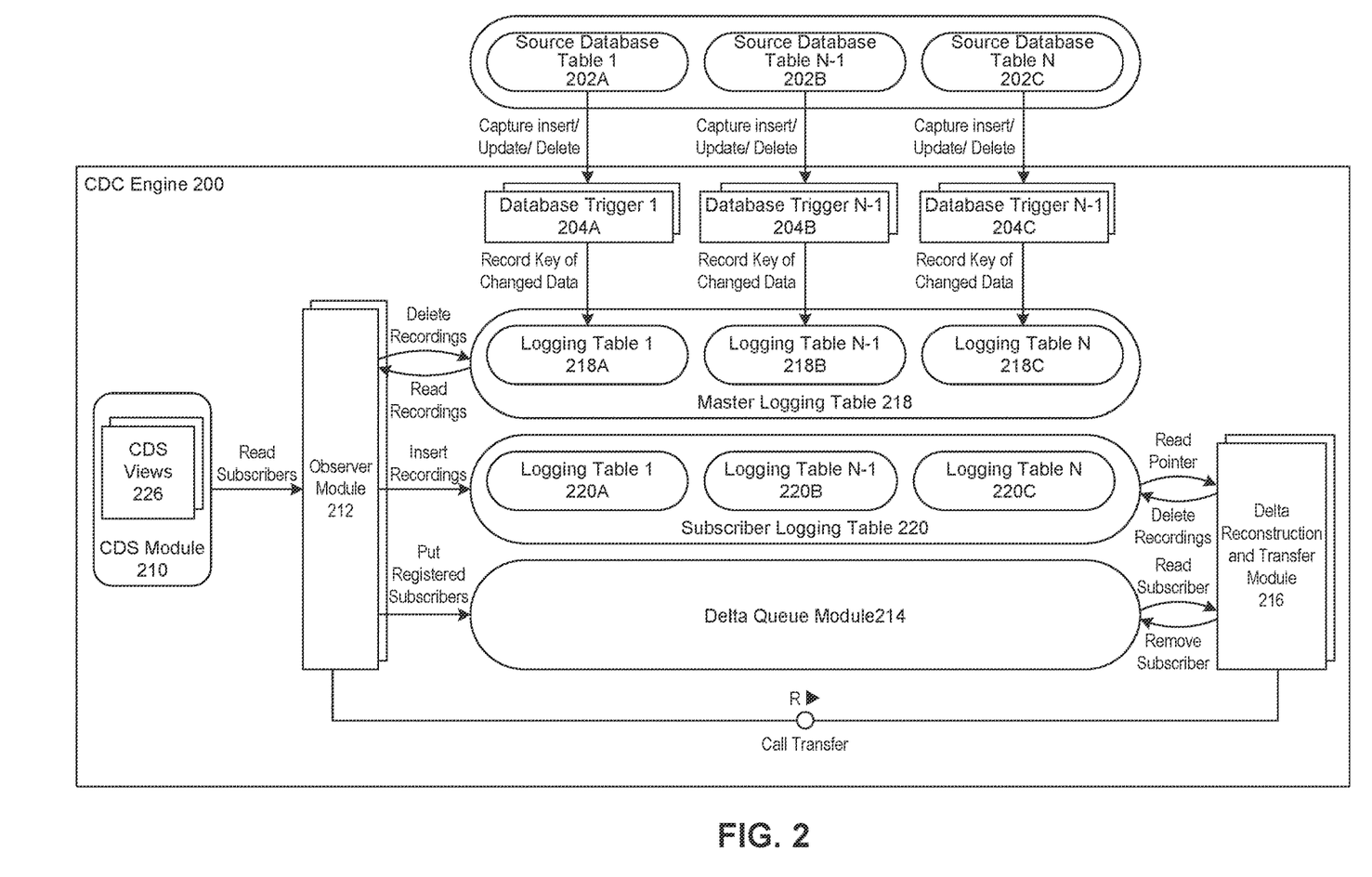
FIG. 2 is a block diagram of an example change data capture (CDC) engine of the system of FIG. 1, according to some embodiments.

FIG. 2 illustrates an example CDC engine 200 for replicating data of source databases 202. The CDC engine 200 may include database triggers 204, a master module 206, a subscriber module 208, a core data services (CDS) module 210, an observer module 212, a delta queue module 214, and/or a delta reconstruction and transfer (DRT) module 216.

Database Triggers

The database triggers 204 may capture operations of records in the source database tables 202. To do so, for each source database table 202, the CDC engine 200 may have four database triggers—one insert trigger, two update triggers, and one delete trigger. For example, for source database table 202A, there may four database triggers 204A. Likewise, for source database 202B, there may four additional database triggers 204B and, for source database 202C, there may be another four additional database triggers 204C.

For each set of database triggers 204, the insert and delete triggers may allow dedicated handling of inserting and deleting source databases 202's records, respectively. For example, the insert trigger may detects new records inserted in the source databases 202 and capture the related information in the master logging tables 218. The delete trigger may detect records deleted from the source database 202 and write the related information into the master logging tables 218. Moreover, the update triggers may allow dedicated handling of updates on key fields and non-key fields of source databases table 202's records. As such, one update trigger may handle updates on key fields, and another update trigger may handle updates on non-key fields. The related information about which records have been changed in the source database tables 202 are written into the master logging tables 218. For key field updates, the appropriate update trigger may first capture a deletion based on the previous key field record in the master logging table 218 and then capture an insert for the new key field record in the master logging table 218. For non-key field updates, the appropriate update trigger may capture an update operation for the existing non-key field record (e.g., without deleting) in the master logging table 218.

By operating in such a fashion, the current CDC engine 200 provides several advantages over similar types of CDC engines. First, the CDC engine 200's database triggers 204 are adaptable to an unlimited number of configurations. Second, the CDC engine 200 does not need to create additional database triggers 204 for the source database 202. Also, when there is a change in operation for a specific record (e.g., insert, delete, or update), the CDC engine 200 does not lock, since database triggers 204 handles each operation separately. Other advantages will be apparent to persons skilled in the relevant art(s).

Master and Subscriber Modules

The master module 206 may include master logging tables 218. Likewise, the subscriber module 208 may include subscriber logging tables 220. As such, for each source database table 202, the master module 206 and the subscriber module 208 may contain a master logging table 218 and a subscriber logging table 220, respectively. For example, as illustrated, for source database table 202A, the master module 206 and the subscriber module 208 may contain a master logging table 218A and a subscriber logging table 220A. Similarly, for source database tables 202B and 202C, the master module 206 and the subscriber module 208 may contain master logging tables 218B and 218C and subscriber logging tables 220B and 220C, respectively.

Along these lines, database triggers 204 may be associated with master logging tables 218. For example, as illustrated, database triggers 204A—including an insert trigger, a delete trigger, and two update triggers—may be associated with master logging table 218A. Likewise, database triggers 204B and 204C—including an insert trigger, a delete trigger, and two update triggers—may be associated with master logging table 218B and 218C, respectively.

Accordingly, after the database triggers 204 identify updates in the source database tables 202, the database triggers 204 may forward the operation (e.g., insert, delete, or update) to the appropriate master logging table 218. In doing so, the database triggers 204 may provide a replication of the change in a sequence identification number ("sequence ID") and a timestamp. As such, the master logging table 206 may store the records and their associated sequence IDs and timestamps.

Moreover, the observer module 212 provides an indication of whether record is committed (e.g., finalized) or uncommitted (e.g., not finalized) in the source database 202. Along these lines, as will be discussed in more detail below, the observer module 212 will monitor the master logging tables 218 records and read/delete committed records from the master logging tables 218 and insert them into the appropriate subscriber logging table 220. For example, if the observer module 212 identifies a particular record of master logging table 218A as being committed, it will read/delete from the master logging table 218 and insert it into subscriber logging table 220A.

Figure 3:
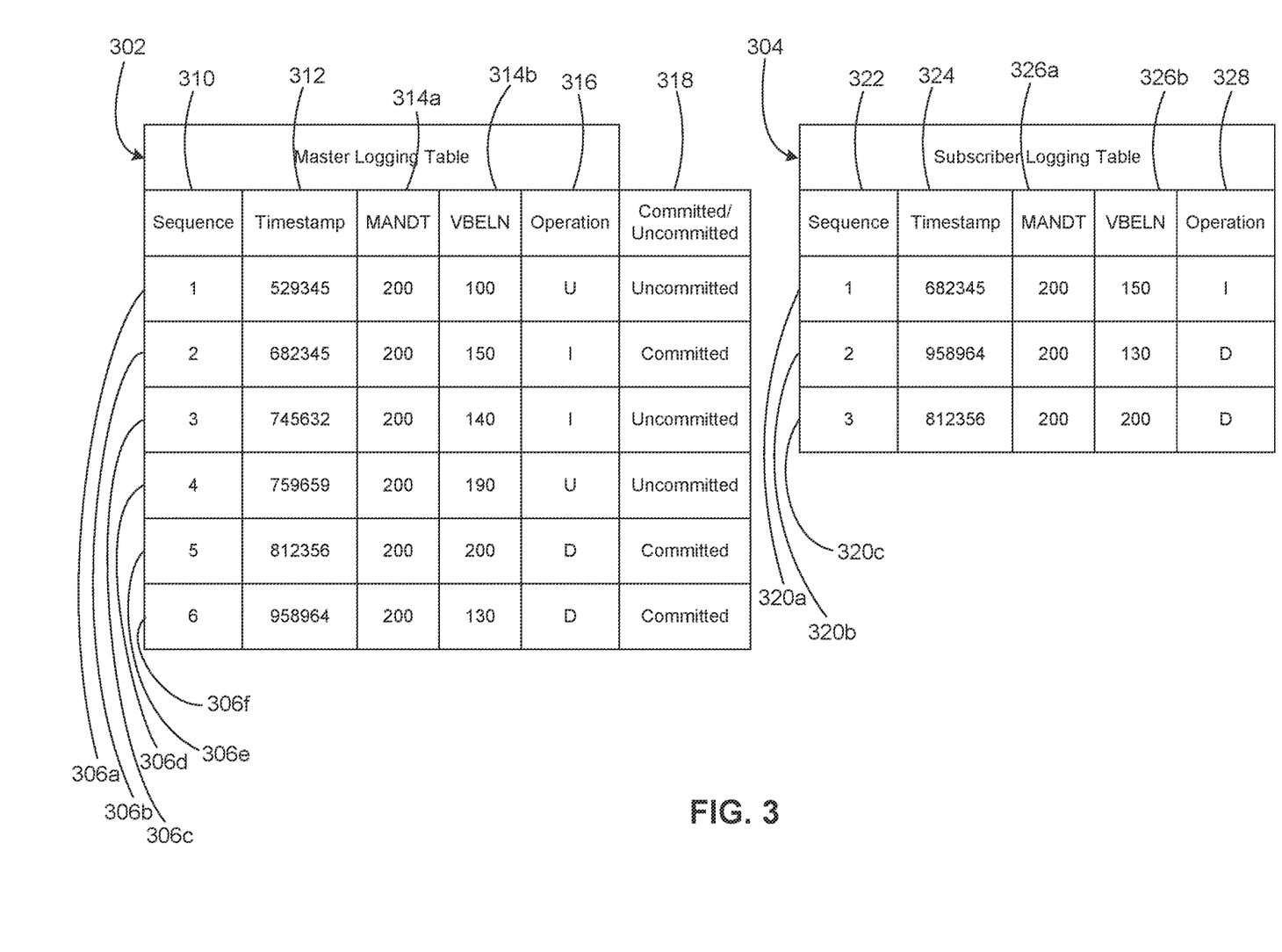
FIG. 3. is an example replication of records from a master logging table to a replication logging table of the CDC engine of FIG. 2, according to some embodiments.
Figure 4:
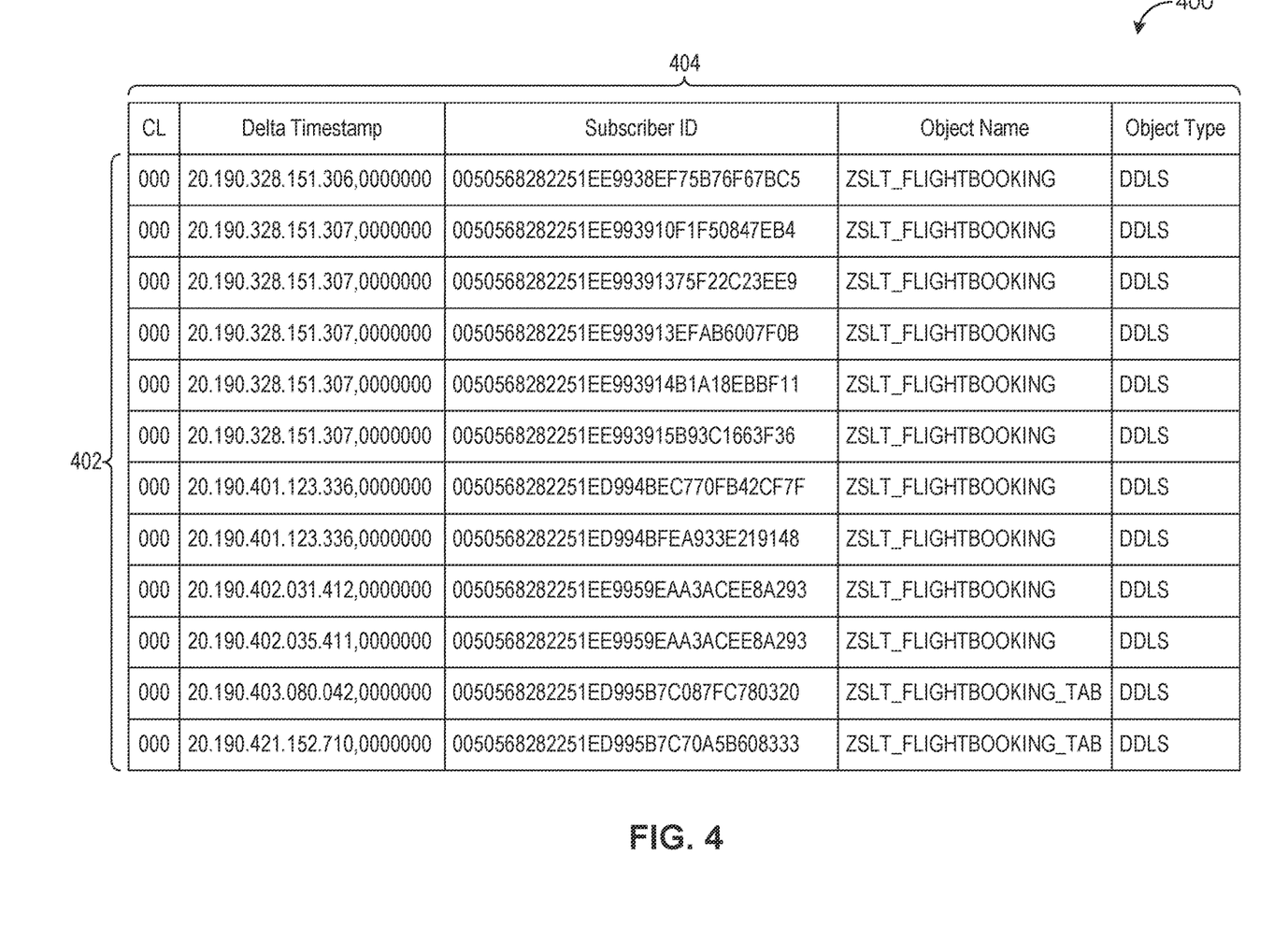
FIG. 4 is an example delta queue logging table of the CDC engine of FIG. 2.

Accordingly, in some embodiments, the master and subscriber logging tables 218 and 220 may serve as the central storage of all changes that are captured by the database triggers 204. As such, the master and subscriber logging tables 218 and 220 may have similar structures. FIG. 3 illustrates an example replication of records from a master logging table 302 to a corresponding subscriber logging table 304. As described above, the master logging table 302 may store various records 302 received on the source databases 108. As such, for each record 306, the master logging table 302 may assign a sequence number 310, a timestamp 312 of when the operation was captured by the database triggers 204 (of FIG. 2), key operation fields 314 of the source database table 202 (of FIG. 2), and/or an operation type 316. The sequence number 310 may be a unique number of the record in the master logging table 302. As indicated above, for each record of the master logging table 202, the observer module 212 (of FIG. 2) may determine if it is committed or uncommitted. FIG. 4 illustrates a committed/uncommitted indication for each record 306 of the master logging table 302.

Accordingly, after the master logging table 302's records 306 are committed, the observer module 212 (of FIG. 2) may create corresponding records 320 for the subscriber logging table 304. Like the master logging table 302's records 306, the subscriber logging table 304's records 320 may also include a timestamp 324 of when the operation was captured by the database triggers 204 (of FIG. 2), key operation fields 326 of the source database 202 (of FIG. 2), and/or an operation type 328, which may be copies of those records 306 of the master logging table 302. The subscriber logging table 304's records 306 may also include a sequence number 322, which may be different from the sequence number 310 of the master logging table 302's records 306.

As the observer module 212 (of FIG. 2) may create records 320 for the subscriber logging table 304 after the corresponding record is committed in the master logging table 302, the subscriber logging table 304's records may be in a different order than the corresponding master logging table 302's records. For example, the master logging table 302's sequence number "1" record 306a may be uncommitted and thus not entered into the subscriber logging table 304. However, the master logging table 302's sequence number "2" record 306b may be committed and thus entered into the subscriber logging table 304 as sequence number "1."

As such, the master logging table 302's committed records 306b, 306e, and 306f may be entered into the subscriber logging table 302 before the uncommitted records 306a, 306c, and 306d. Thus, the master logging table 302's committed records 306b, 306e, and 306f may have sequence numbers 310 different from their corresponding subscriber logging table 304's entries 320's sequence numbers 322. Indeed, the corresponding subscriber logging table 304's sequence numbers 322 may be greater and/or less than the master logging table 302's committed records 306b, 306e, and 306f.

Along these lines, the master logging table 302's committed records 306b, 306e, and 306f may be entered into the subscriber logging table in different orders. For example, the master logging table 302's records 306e and 306f may have committed at different times. For example, the master logging table 302's record 306f may have been committed before the master logging table 302's record 306e. As such, the subscriber logging table 304 may have created a record for the master logging table 302's record 306f before that of the master logging table 302's record 306e resided before record 306. As illustrated, although the master logging table 302's record 306e is committed before the master logging table 302's record 306f, the subscriber logging table 304's record 320a corresponds to the master logging table 302's record 306f may be before the subscriber logging table 304's record 320b corresponding to master logging table 302's record 306e.

As such, the subscriber logging table 304's sequence numbers 322 may ascend regardless of the master logging table 302's sequence number 310. For example, as stated above, the master logging table 302's record 306e may be committed before the master logging table 302's record 306f. Moreover, the master logging table 302's record 306b may be committed before the master logging table 302's records 306e and 306f. Accordingly, the master logging table 302's committed records 306b, 306e and 306f corresponding subscriber logging table 304's records 320 may be "1," "2" and "3," respectively (that is, ascending by one). However, a person of ordinary skill in the art would readily understand that the subscriber logging table 304's sequence number 322 may ascend in any order and/or interval.

CDS Module

The CDS module 210 may store CDS views 226, which may be manually provided by a third party. As such, the CDS views 226 may indicate the source tables 202 to be monitored by the database triggers 204. As stated above, in some embodiments, users may subscribe to receiving monitoring and receiving updates of a single source database 202A. Accordingly, where users subscribe to a single source database 202A, CDC views 226 may specify a particular source database 202A to be monitored. For example, one CDC view 226A may specify a source database 202A containing data relating to travel bookings to be monitored, and another CDC view 226B may specify flight bookings to be monitored.

As also stated above, in some embodiments, users may subscribe to monitoring and receiving updates of data shared between multiple source databases 202A and 202B. Accordingly, where users do so, a CDC view 226A may specify the multiple source databases 202A and 202 and the data fields sharing that may share data. The data fields may be a type of data to be received by the source databases 202A and 202B. For example, source database 202A may contain data relating to travel bookings and thus have key fields for travel bookings. For example, the source database 202A's key fields may include a travel type (e.g., car, train, bus), a travel type carrier (e.g., United Airlines, Lufthansa Airlines, Amtrak, National Express), a travel type's unique identification number, a departure time, and an arrival time. And, like source database 202A, source database 202B may contain data relating to flight bookings and have key fields relating to the flight bookings. For example, the source database 202A's key fields may be a travel type carrier, a travel type's unique identification number, a departure time, an arrival time, an individual's name who booked the flight, and an airport code. As such, for each record, the source databases 202A and 202B may contain data for the applicable key field. Thus, although source databases 202A and 202B may share the same key fields, they may also have different key fields.

Along these lines, the CDS views 226 may specify key fields of the source databases 202 for replication. Accordingly, although source databases 202 may include several key fields, the CDS views 226 may specify a subset of the key fields of the source databases 202 for replication. For example, although the source database 202A's key fields may include a travel type, a travel type carrier, a travel type's unique identification number, a departure time, and an arrival time, the CDS views may specify replication of certain key fields. As such, where the CDS views 226 specify the multiple source databases 202A and 202B, the specified key fields for replications may be different from the data fields shared between them.

Further, the CDS views 226 may provide filters of the source databases 202. As such, the CDC engine may only replicate data according to the filter criteria. For example, although the source database 202A's key fields may include a travel type, a travel type carrier, a travel type's unique identification number, a departure time, and an arrival time, a particular CDS view 226A may include a key field filter for the travel type carrier "Delta Airlines." Thus, the CDC engine may only replicate changes to data records/records for the travel type carrier "Delta Airlines" key field.

Observer Module

As stated previously, the observer module 212 may be in communication with the master logging tables 218 and the subscriber logging tables 220. As such, explained above, the observer module 212 may identify when a record is committed in the master logging tables 218 and remove it therefrom. Thereafter, the observer module 212 may place the committed records into the subscriber logging tables 220.

After a record is committed in the master logging tables 218, the observer module 212 may also be in communication with the CDS module 210 to determine the CDS views 226 associated with the master logging tables 218 receiving the committed record. As explained above, CDS views 226 may specify a single source database 202A or multiple source databases 202, which may correspond to different master logging tables 218A and/or 218B. Accordingly, where the CDS views 226 specify multiple logging databases 218 and a record is committed into one of the specified multiple logging tables 218, the observer module 212 may identify such CDS views 226.

After identifying the CDS views 226, the observer module 212 may further identify the users requesting the CDS views 226 (e.g., replication of data that is changed in the source databases 202 and copied into the master and subscriber logging tables 218 and 220). The observer module 212 may then provide the delta queue module 214 with the identified users' unique identification numbers and the source databases 202 of the requested CDS views 226.

Delta Queue Module

As such, the delta queue module 214 may store identification numbers of identified users and the requested CDS views 226 as records. Also, upon receipt of the records, the delta queue module 214 may provide a record, along with a timestamp indicating a time of receipt of the record, to the delta queue module 214. The delta queue module 214 may then store the record.

FIG. 4 illustrates an example delta queue logging table 400 having records 402 and key fields 404. As illustrated, the key fields 404 may include a timestamp identification, a unique user identification number, an identification of the source database specified in the requested CDS views, and/or an identification of the target database receiving the replication. Thus, the records 402 may contain unique data for each of the key fields 404.

Moreover, as previously described, CDS views 226 (of FIG. 2) may specify multiple source databases 202 (of FIG. 2). Accordingly, the delta queue logging table 400 may contain separate records 402 for each of the source databases 202 (of FIG. 2) specified in the CDS views 226 (of FIG. 2) that has updated. In this manner, the CDS views are only processed once data of the specified source databases 202 (of FIG. 2) are updated. This will confirm that updates to each of the sources databases 202 (of FIG. 2) are accurately and timely replicated without locking.

DRT Module

Referring back to FIG. 2, the DRT module 216 may be in communication with the subscriber logging tables 220 and the delta queue module 214 to provide updates to the replication server 106 (of FIG. 1) based on committed records of the subscriber logging tables 220. In order to do so, the DRT module 216 receives notification that the delta queue module 214 has received a record from the observer 208. The DRT module 216 may then prepare a new record based on the delta queue's module's received record and provide it to the subscribed users (e.g., target database tables 112 updated by the replication server 106 of FIG. 1).

Figure 5:
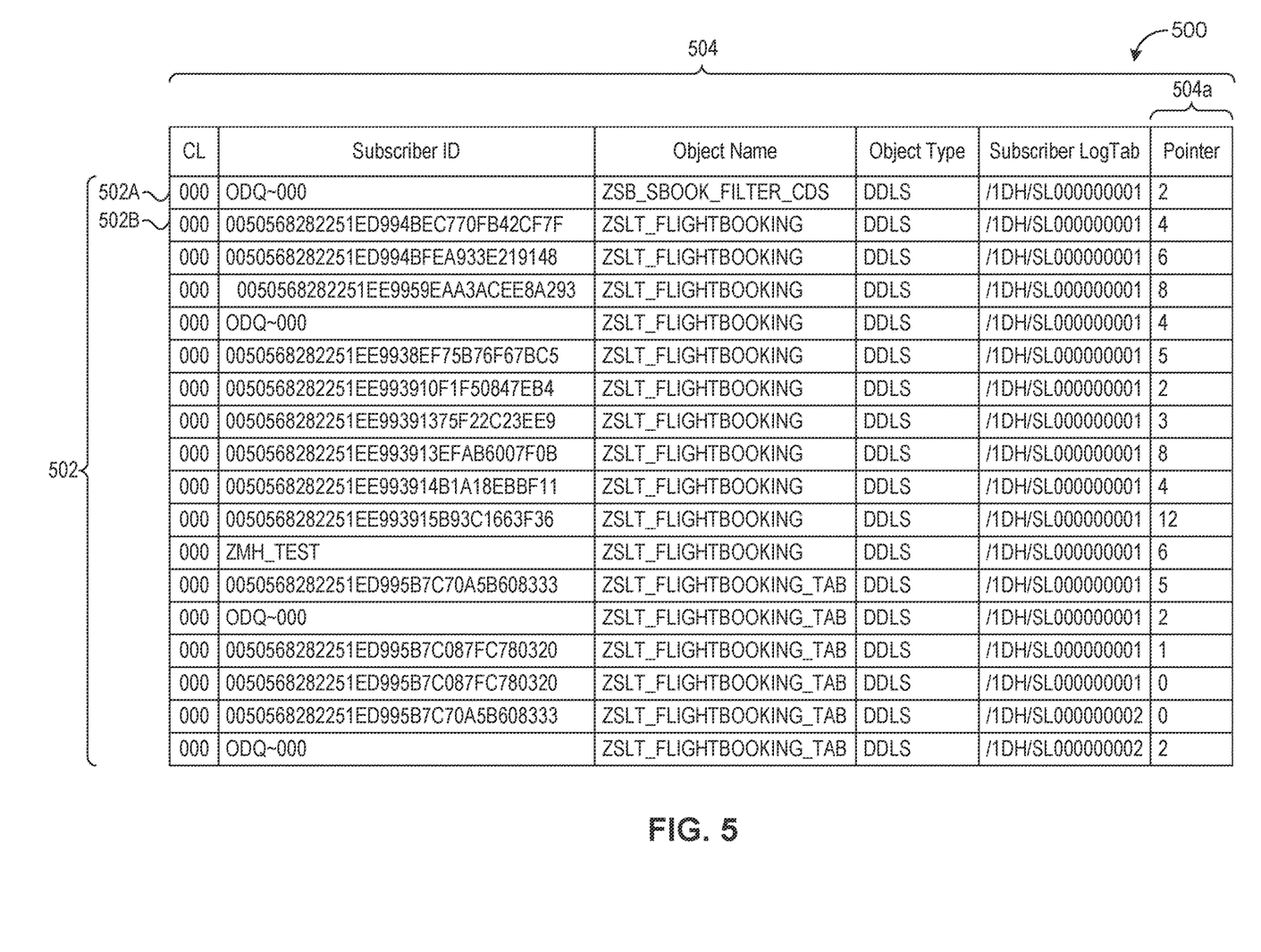
FIG. 5 is an example delta reconstruction and transfer (DRT) logging table of the CDC engine of FIG. 2, according to some embodiments.

FIG. 5 illustrates an example DRT module 500 storing multiple records 502 and key fields 504. Like those of the delta queue 400 (of FIG. 4), the key fields 504 may a unique user identification number and an identification of the source database table or the requested CDS views. In addition, the key fields may include a pointer 504A referring to a sequence number of a subscriber logging table corresponding to the source database table or the requested CDS views. As discussed above, as the records are committed and placed into the subscriber logging tables, they are provided with a sequence number in consecutive order. As such, the pointer 504A may refer to the sequence number of the last record in the subscriber logging table that the DRT module 216 (of FIG. 2) has sent to the registered subscribers such as the replication server for a particular record 502A of the DRT module 500. As such, records 502A and 502B may include pointers to different sequence numbers of the same subscriber logging table.

Referring back to FIG. 2, after the DRT module 216 (of FIG. 2) has sent particular records of a specific subscriber logging table to all subscribers specified by each record, the DRT module 216 may delete the corresponding records from the subscriber logging tables 220. For example, in referring again to FIG. 5, as stated above, the DRT module 500's records 502 may reference—via the pointer 504A—to different sequence numbers of different subscriber logging table 220 (of FIG. 2). As illustrated, the DRT module 500's records 502 are directed to subscriber logging tables "/1DH/SL00000001" and "/1DH/SL00000002" and list different sequence numbers in their respective pointers 504A. For example, records 502A and 502B are directed to subscriber logging tables "/1DH/SL00000001," whereas the DRT module 500's pointer 504A points to the subscriber logging table 220's sequence number "2" and "4" for records 502A and 502B, respectively.

Accordingly, based on the lowest sequence number provided by the DRT module 500's pointer 504A for a specific subscriber, the DRT module 216 (of FIG. 2) may delete corresponding records from the subscriber logging table that has lower sequence numbers than the lowest sequence number in the DRT module 500. For example, for the DRT module 500's records 502 corresponding to the subscriber logging table "/1DH/SL00000001," the lowest sequence number is "2." Accordingly, the DRT module 216 (of FIG. 2) may delete entry of the subscriber logging table "/1DH/SL00000001" having the sequence number lower equal "2." The DRT module 216 (of FIG. 2) may continue this process until all of the DRT module 500's records 502 are transferred to the subscribers (e.g. replication server).

Example Methods

Figure 6:
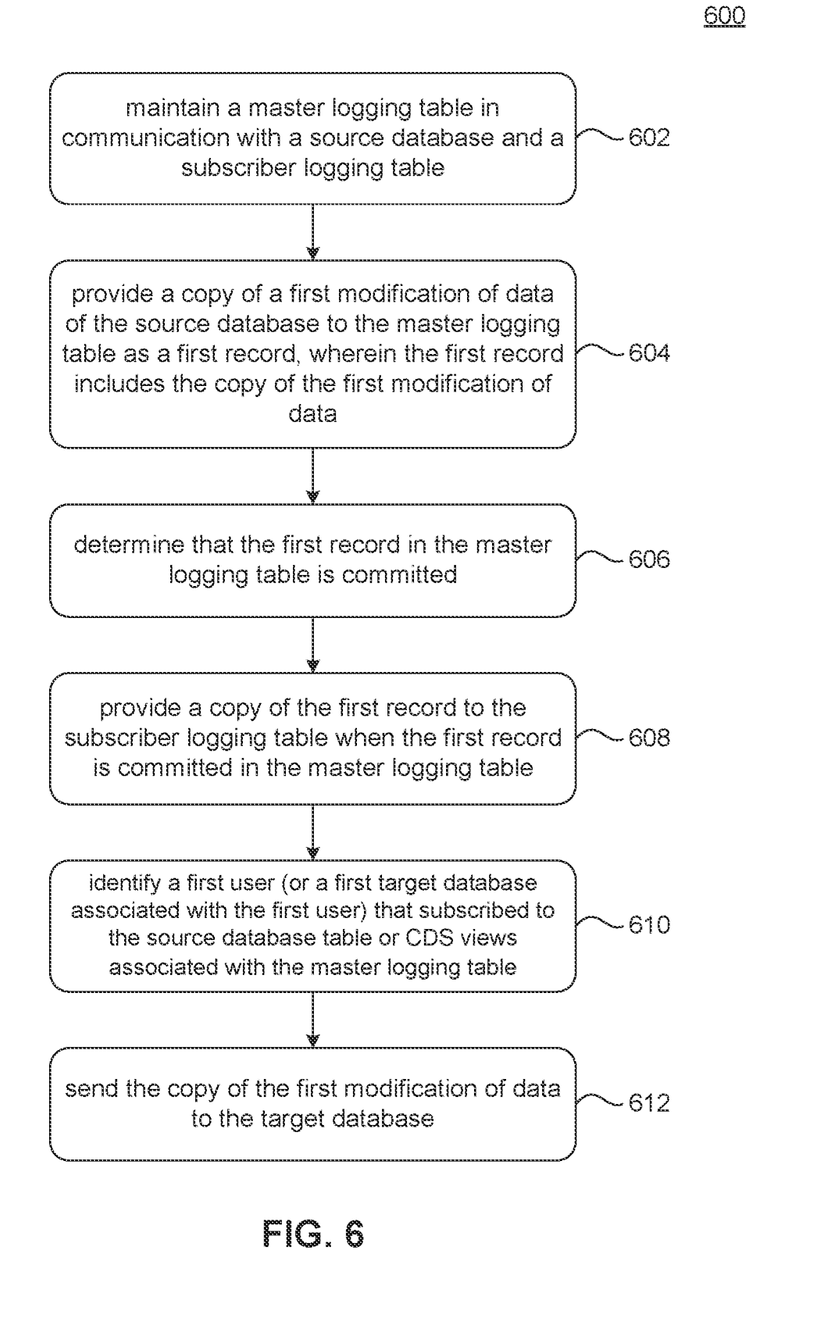
FIGS. 6-8 are example processes of the CDC engine of FIGS. 1 and 2, according to some embodiments.

FIG. 6 is a flowchart for a method 600 for transferring data to target databases, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 1-3, as will be understood by a person of ordinary skill in the art.

In 602, the CDC engine 200 may maintain a master logging table 218 in communication with a source database table 202 and a subscriber logging table 220. In some embodiments, the CDC engine 200 may comprise a plurality of master logging tables 218 and subscriber logging tables 220, wherein each one of the master logging tables 218 and subscriber logging tables 220 has a corresponding source database table 202.

In 604, the CDC engine 200 may provide a copy of a first modification of data of the source database table 202 to the master logging table 218 as a first record, wherein the first record includes the copy of the first modification of data. As such, a copy of a first modification of data in source database table 202A to the master logging table 218A as a first record in the master logging table 218A, and a copy of a first modification of data in source database table 202B to the master logging table 220B as a first record in the master logging table 220B.

In 606, the CDC engine 200 may determine that the first record in the master logging table 302 is committed. The master logging table 302's records 306 may be uncommitted or committed. As such, although the records 306 are in the master logging table 302, they may be uncommitted. Accordingly, although the master logging table 302 receives records 306a, 306c and 306d before records 306b, 306e and 306f, records 306b, 306e and 306f may be committed and records 306a, 306c and 306d may be uncommitted.

In 608, the CDC engine 200 may provide a copy of the first record 306a to the subscriber logging table 304 when the first record is committed in the master logging table 302. At this point in time the master logging table 302 record 306a may be deleted.

In 610, the CDC engine 200 may identify a first user (or a first target database 112 associated with the first user) that subscribed to the source database table 202 or CDS views 226 associated with the master logging table 302. The first user may request receipt of the data at the target database table 112.

In 612, the CDC engine 200 may send the copy of the first modification of data to transfer the first modification of data to the target database table 112. The target database table 112 may be part of a target system managed by a user and may be a replicate of the source database table 202. And, this step may be performed by the replication server 106.

Figure 7:
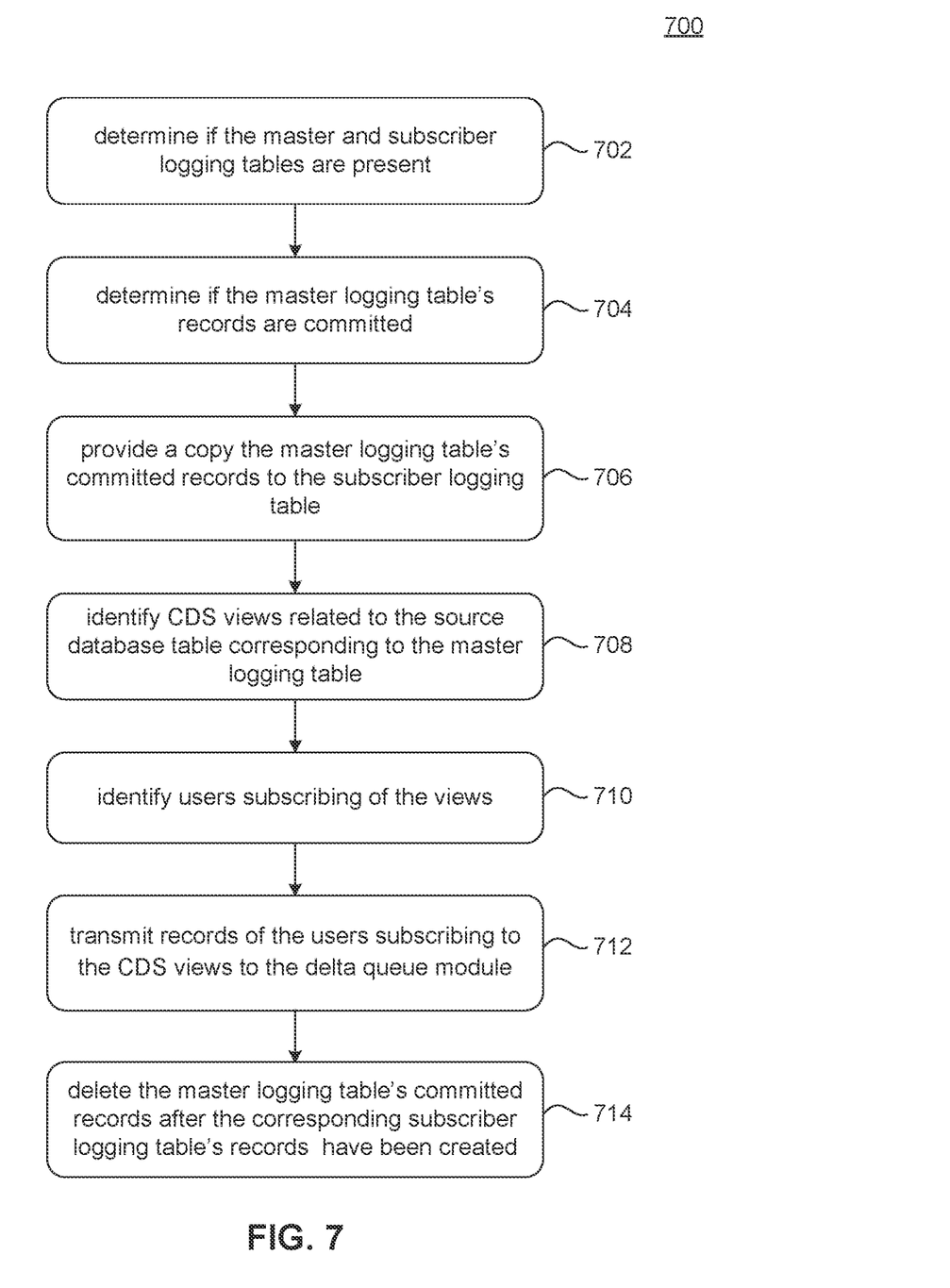

FIG. 7 illustrates a flowchart for a method 700 for replicating of data between the master logging table and the subscriber logging table, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 2 and 3, as will be understood by a person of ordinary skill in the art.

In 702, the observer module 212 may determine if the master and subscriber logging tables 218 and 220 are present.

In 704, the observer module 212 may determine if the master logging table 302's records 306 are committed. As discussed above, the master logging table 302's records 306 may be uncommitted or committed. As such, although the records 306 are in the master logging table 302, they may be uncommitted.

In 706, the observer module 212 may provide a copy of the master logging table 302's committed records 306b, 306e and 306f to the subscriber logging table 304. Accordingly, although the master logging table 302 receives records 306a, 306c and 306d before records 306b, 306e and 306f, records 306b, 306e, and 306f may be committed and records 306a, 306c and 306d may be uncommitted.

In 708, the observer module 212 may identify CDS views 226 related to the source database table 202 corresponding to the master logging table 216. As discussed above, the source database table 202A may have corresponding master logging table 218A and subscriber logging table 220A, and the subscribing logging table 304 may include records 320. For example, a first source database table 202A may have a first master and subscriber logging table 218A and 220A and a second source database table 202B may have a second master and subscriber logging table 220B and 220B.

In 710, the observer module 212 may identify users subscribing of the CDS views 226. For example, some users may subscribe to receiving updates to data of source database tables 202 specified in some CDS views 226, while other users may subscribe to receiving updates to data of different source database tables 202 specified in other CDS views 226.

In 712, the observer module 212 may transmit records of the users subscribing to the CDS views 226 to the delta queue module 214. Accordingly, where a CDS view 216A specifies a single source database table 202A, the observer module 212 may transmit a single record of the user subscribing to the CDS view 216A to the delta queue module 214. Alternatively, where a CDS view 216A specifies multiple source database tables 202A and 202B, the observer module 212 may transmit multiple records—i.e., a first record of the user subscribing to the CDS view 216A for source database table 202A and a second record of the user subscribing to the CDS view 216A for the other source database table 202B.

In 714, the observer module 212 may delete the master logging table 302's committed records 306b, 306e and 306f after the corresponding subscriber logging table 304's records 320 have been created. This may be done after steps 708, 710, 712 or 714.

Figure 8:
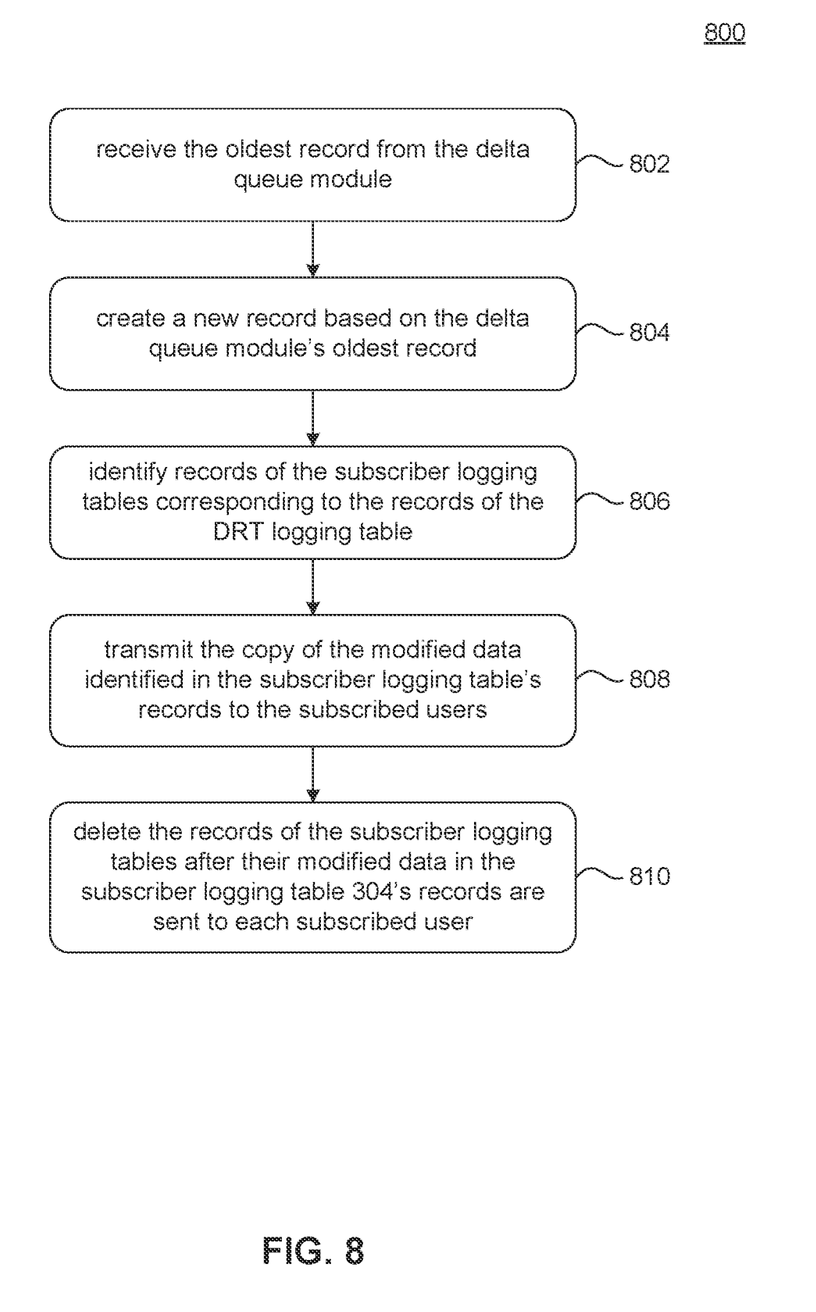

FIG. 8 is a flowchart for a method 800 for transferring data to a user subscribing to the CDS view, according to an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 1-3 and 5, as will be understood by a person of ordinary skill in the art In 802, the DRT module 216 may receive the oldest record from the delta queue module 214. The oldest record may be the record with the earliest/first timestamp. Moreover, as described with respect to FIG. 7, the delta queue module 214's oldest record may be provided by the observer module 212. The delta queue module 214's oldest record may include multiple key fields, such as a timestamp identification, a unique user identification number, an identification of the source database table and/or CDS views.

In 804, the DRT module 216 may create a new record 502 based on the delta queue module 400's oldest record. The DRT module 216's new record may incorporate some of the same key fields as the delta queue module 214's oldest record, such as a timestamp identification, a unique user identification number, and/or an identification of the requested CDS view. In addition, the key fields may include a pointer 504A referring to a sequence number of a subscriber logging table 220 corresponding to the source database table specified in the requested CDS views.

As discussed above, as the records 320 are committed and placed into the subscriber logging tables 304, they are provided with a sequence number 310. As such, as each record 320 is placed into the subscriber logging tables 302, it is provided with the next consecutive, sequence number (e.g., 1, 2, 3, 4 and 5). Therefore, the pointers 504A may refer to the sequence number of the last record in the subscriber logging table that the DRT module 216 (of FIG. 2) has sent to the user subscribed to the CDS view. Along these lines, records 502A and 502B may include pointers to different sequence numbers of the same subscriber logging table.

In 806, the DRT module 216 may identify records 320 of the subscriber logging tables 304 corresponding to the records 502 of the DRT module 500. The records 320 of the subscriber logging tables 304 containing various modified data of the source database tables 202.

In 808, the DRT module 216 may transmit the copy of the modified data identified in the subscriber logging table 304's records 320 to the subscribed users (e.g., target databases 112 and 114 via the corresponding replication server). In doing so, the DRT module 216 may start with the record 320 of the subscriber logging tables 304 corresponding to that identified by the pointer 504 (e.g., sequence number "3").

In 810, the DRT module 216 may delete the records 320 of the subscriber logging tables 304 after their modified data in the subscriber logging table 304's records 320 are sent to each subscribed user (e.g., at target database 112 and 114 via the corresponding replication server).

Example Computer Systems

Figure 9:
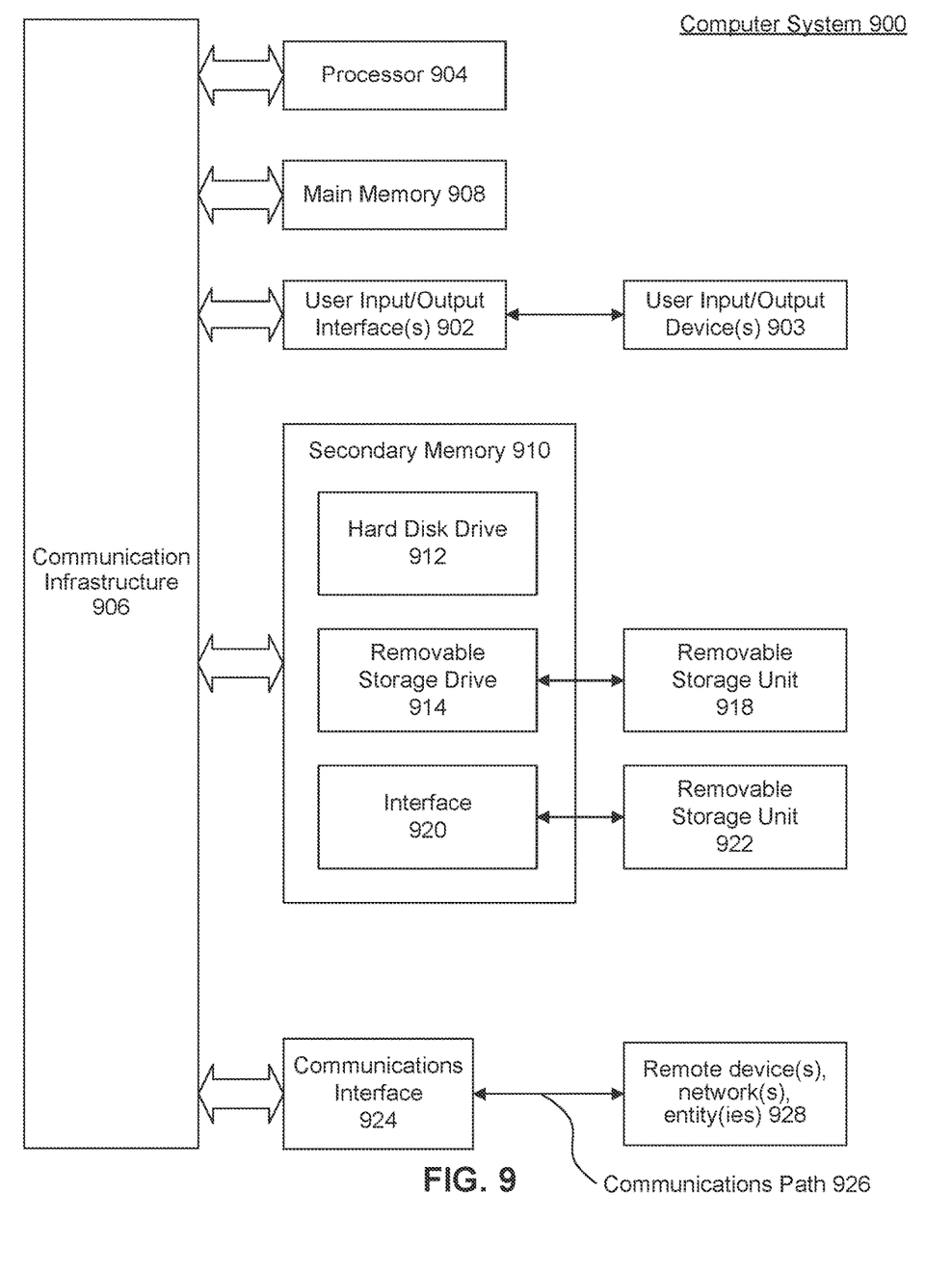
FIG. 9 is an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to a removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for replicating data from a source database table to a target database table, comprising:
    determining, by at least one processor, that a master logging table stored in a storage of a change data capture engine in communication with a source database table of a source system and a subscriber logging table stored in the storage are present;
    determining, by the at least one processor, that a first record of the master logging table is committed in the source database table, wherein the master logging table includes the first record and a second record received from the source database table;
    providing, by the at least one processor, a copy of the first record to the subscriber logging table to create a first corresponding record in the subscriber logging table; and
    deleting, by the at least one processor, the first record from the master logging table after the first corresponding record has been created in the subscriber logging table;
    wherein at least one of the determining, determining, providing, and deleting is performed by one or more computers.

2. The computer-implemented method of claim 1, further comprising:
    determining, by the at least one processor, that the second record is uncommitted in the source database table; and
    maintaining, by the at least one processor, the second record in the master logging table.

3. The computer-implemented method of claim 2, wherein the master logging table receives, from the source database table, the first record as uncommitted at a first point of time, receives, from the source database table, the second record as uncommitted at a second point of time, and wherein the second point of time is prior to the first point of time.

4. The computer-implemented method of claim 3, further comprising:
    determining, by the at least one processor, that the second record in the master logging table is committed in the source database table at a third point of time after the second point of time; and
    providing, by the at least one processor, a copy of the second record to the subscriber logging table when the second record is committed.

5. The computer-implemented method of claim 4, further comprising:
    assigning, by the at least one processor, a master logging table identification number to the first record; and
    assigning, by the at least one processor, a subscriber logging table identification number to the first corresponding record in the subscriber logging table;
    wherein the master logging table identification number is different from the subscriber logging table identification number.

6. The computer-implemented method of claim 1, wherein the first record identifies a change to a database record of the source database table.

7. The computer-implemented method of claim 6, wherein the change to the database record is performed by one or more triggers.

8. The computer-implemented method of claim 7, wherein the one or more triggers include a first trigger configured to receive a record of new data, a second bigger configured to receive a deletion of existing data, and a third and fourth trigger configured to receive an update of existing data, and wherein the change is the record of new data, the deletion of existing data, or the updating of existing data.

9. The computer-implemented method of claim 8, wherein the third trigger is configured to receive key data, and wherein the fourth trigger is configured to receive non-key data, and wherein the first record is key data or non-key data.

10. The computer-implemented method of claim 6, further comprising:
    identifying, by the at least one processor, a subscribed user requesting the change tc the database record of the source database table.

11. The computer-implemented method of claim 10, further comprising:
    identifying, by the at least one processor, a target database associated with the subscribed user; and
    sending a copy of the first corresponding record in the subscriber logging table of data to the target database.

12. The computer-implemented method of claim 11, further comprising:

deleting the first corresponding record in the subscriber logging table after sending the copy of the first corresponding record.

13. System, comprising:

a memory; and at least one processor coupled to the memory and configured to:

determine that a first record of a master logging table is committed in a source database table, wherein the master logging table includes the first record and a second record received from the source database table, wherein the master logging table is stored in a storage of a change data capture engine in communication with the source database table of a source system;

provide a copy of the first record to a subscriber logging table to create a first corresponding record in the subscriber logging table, wherein the subscriber logging table is stored in the storage;

delete the first record from the master logging table after the first corresponding record has been created in the subscriber logging table;

determine that the second record is uncommitted in the source database table; and maintain the second record in the master logging table.

14. The system of claim 13, wherein the master logging table receives, from the source database table, the first record as uncommitted at a first point of time, receives, from the source database table, the second record as uncommitted at a second point of time, and wherein the second point of time is prior to the first point of time.

15. The system of claim 13, wherein the at least one processor is further configured to:

determine that the second record in the master logging table is committed in the source database table at a third point of time after the second point of time; and provide a copy of the second record to the subscriber logging table when the second record is committed.

16. The system of claim 13, wherein the at least one processor is further configured to:

assign a master logging table identification number to the first record; and assign a subscriber logging table identification number to the first corresponding record in the subscriber logging table;

wherein the master logging table identification number is different from the subscriber logging table identification number.

17. The system of claim 13, wherein the first record identifies a change to a database record of the source database table.

18. The system of claim 17, wherein the change to the database record is performed by one or more triggers, and wherein the one or more triggers include a first trigger configured to receive a record of new data, a second trigger configured to receive a deletion of existing data, and a third and fourth trigger configured to receive an update of existing data, and wherein the change is the record of new data, the deletion of existing data, or the updating of existing data.

19. The system of claim 17, wherein the at least one processor is further configured to:

identify a subscribed user requesting the change to the database record of the source database table;

identify a target database associated with the subscribed user; and send a copy of the first corresponding record in the subscriber logging table to the target database.

20. A non-transitory computer-readable device having instructions stored thereon that, when executed by at least one computing device, cause the at least one computing device to perform operations comprising:

determining that a master logging table stored in a storage of a change data capture engine in communication with a source database table of a source system and a subscriber logging table stored in the storage are present;

determining that a first record of the master logging table is committed in the source database table, wherein the master logging table includes the first record and a second record received from the source database table;

providing a copy of the first record to the subscriber logging table to create a first corresponding record in the subscriber logging table;

deleting the first record from the master logging table after the first corresponding record has been created in the subscriber logging table;

assigning a master logging table identification number to the first record; and assigning a subscriber logging table identification number to the first corresponding record in the subscriber logging table;

wherein the master logging table identification number is different from the subscriber logging table identification number.

* * * * *